United States Patent
Bearman et al.

(10) Patent No.: US 12,366,954 B2
(45) Date of Patent: Jul. 22, 2025

(54) STRETCHING CONTENT TO INDICATE SCROLLING BEYOND THE END OF THE CONTENT

(71) Applicant: Google LLC, Mountain View, CA (US)

(72) Inventors: Nicholas John Bearman, London (GB); JT DiMartile, Seattle, WA (US); Selim Flavio Cinek, Zürich (CH); Jorim Dorian Jaggi, Zürich (CH); Michel Comin Escude, Mountain View, CA (US); Sebastian Johannes Bauer, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/258,757

(22) PCT Filed: Apr. 23, 2021

(86) PCT No.: PCT/US2021/028742
§ 371 (c)(1),
(2) Date: Jun. 21, 2023

(87) PCT Pub. No.: WO2022/216299
PCT Pub. Date: Oct. 13, 2022

(65) Prior Publication Data
US 2024/0377941 A1    Nov. 14, 2024

Related U.S. Application Data

(60) Provisional application No. 63/171,023, filed on Apr. 5, 2021.

(51) Int. Cl.
G06F 3/0485    (2022.01)
G06F 3/0481    (2022.01)

(52) U.S. Cl.
CPC .......... G06F 3/0485 (2013.01); G06F 3/0481 (2013.01)

(58) Field of Classification Search
CPC ... G06F 3/0485; G06F 3/0481; G06F 3/04855
See application file for complete search history.

(56) References Cited

U.S. PATENT DOCUMENTS

2011/0202859 A1    8/2011    Fong
2012/0131500 A1*   5/2012    Fujisawa ............. G06F 3/04883
                                                          715/800

(Continued)

FOREIGN PATENT DOCUMENTS

EP    3051403 A1    8/2016
FR    2984545 A1    6/2013

(Continued)

OTHER PUBLICATIONS

Dinh Quyen Nguyen et al., Visualization to Support Augmented Web Browsing, Nov. 1, 2013, International Conference on Web Intelligence and Intelligent Agent Technology, pp. 535-541 (Year: 2013).*

(Continued)

*Primary Examiner* — Tam T Tran
(74) *Attorney, Agent, or Firm* — Shumaker & Sieffert, P.A.

(57) ABSTRACT

Aspects of this disclosure are directed to techniques that enable a computing device to provide a visual indication that there is no additional content to scroll. When a user continues to perform a scroll gesture and scrolls to the end of the content and attempts to continue to scroll the content (i.e., overscrolls the content), a computing device configured in accordance with the techniques of this disclosure may visually stretch at least a portion of the displayed content. In various instances, the computing device may determine various characteristics of the scroll gesture, such as location (Continued)

on a presence-sensitive screen of the computing device, velocity, acceleration, duration, etc. Based on one or more of these scroll gesture characteristics, the computing device may determine a stretch ratio and may apply the stretch ratio to at least a portion of the displayed content.

18 Claims, 5 Drawing Sheets

(56) References Cited

U.S. PATENT DOCUMENTS

| | | |
|---|---|---|
| 2014/0002502 A1 | 1/2014 | Han |
| 2014/0232754 A1 | 8/2014 | Wang |
| 2014/0325445 A1 | 10/2014 | Akella |
| 2015/0074592 A1* | 3/2015 | Kuscher ............... G06F 3/0481 715/784 |
| 2015/0089454 A1* | 3/2015 | Wu ....................... G06F 3/0488 715/863 |
| 2015/0205476 A1* | 7/2015 | Kuscher ............... G06F 3/0485 715/784 |
| 2015/0220258 A1 | 8/2015 | Mikami et al. |
| 2016/0188149 A1 | 6/2016 | Kuscher et al. |

FOREIGN PATENT DOCUMENTS

| | | |
|---|---|---|
| WO | 2011046766 A2 | 4/2011 |
| WO | 2014192535 A1 | 12/2014 |
| WO | 2016016902 A1 | 2/2016 |

OTHER PUBLICATIONS

Howard Moshtael et al., Saccadic Scrolling: Speed Reading Strategy Based on Natural Eye Movements, Aug. 1, 2016, International Conference on Intelligent Human-Machine Systems and Cybernetics, pp. 596-600 (Year: 2016).*

Enabled Solutions, "How to create beautiful Stretchy Layouts on iOS using Auto Layout and SnapKit", Nov. 22, 2017, 20 pp.

International Search Report and Written Opinion of International Application No. PCT/US2021/028742, dated Jan. 7, 2022, 16 pp.

Response to Communication Pursuant to Rules 161(1) and 162 EPC dated Nov. 14, 2023, from counterpart European Application No. 21724961.4, filed May 13, 2024, 22 pp.

Notice of Intent to Grant and Text Intended to Grant from counterpart European Application No. 21724961.4 dated Nov. 5, 2024, 41 pp.

* cited by examiner

STRETCHING CONTENT TO INDICATE SCROLLING BEYOND THE END OF THE CONTENT

BACKGROUND

A computing device may include a display device that displays content from one or more applications executing at the computing device, such as textual or graphical content. A user may wish to scroll content displayed on the display of the computing device to view additional portions of the content not presently displayed on the display. For instance, a user may interact with a graphical user interface using a presence-sensitive screen (e.g., touchscreen) of the computing device to scroll the displayed content. Once the end of the content is reached (i.e., all of the content has been scrolled such that there is no additional content in the direction of the scroll that is not presently displayed), the computing device may cease scrolling the content. If the computing device does not indicate that there is no additional content to scroll, the user may attempt to continue to scroll the content or may believe that there is still additional content to display.

SUMMARY

In general, aspects of this disclosure are directed to techniques that enable a computing device to provide a visual indication that there is no additional content to scroll. When a user continues to perform a scroll gesture and scrolls to the end of the content and attempts to continue to scroll the content (i.e., overscrolls the content), a computing device configured in accordance with the techniques of this disclosure may visually stretch at least a portion of the displayed content. In various instances, the computing device may determine various characteristics of the scroll gesture, such as location on a presence-sensitive screen of the computing device, velocity, acceleration, duration, etc. Based on one or more of these scroll gesture characteristics, the computing device may determine a stretch ratio and may apply the stretch ratio to at least a portion of the displayed content. For example, the computing device may generate a bitmap representation of at least a portion of the displayed content and may apply the stretch ratio to the bitmap representation to generate a stretched bitmap representation. As another example, the computing device may apply the stretch ratio to the low-level surface that holds and controls what the end pixels will look like on the display prior to the pixels being displayed. The computing device generates an updated graphical user interface that includes the stretched bitmap representation and displays the updated graphical user interface showing the stretched content. In this way, the computing device may provide a visual indication that there is no additional content to scroll.

In one example, the disclosure is directed to a method that includes outputting, for display by a display device, a graphical user interface of an application executing at a computing device, wherein the graphical user interface includes a content portion and an application interface portion different from the content portion; receiving, by the computing device, an indication of a user input to scroll, in a direction, content included in the content portion of the graphical user interface; and responsive to determining, by the computing device, that there is no additional content to scroll in the direction: determining, by the computing device, one or more characteristics of the user input; determining, by the computing device and based on at least one of the one or more characteristics of the user input, a stretch ratio; generating, by the computing device, an updated content portion by at least applying the stretch ratio to at least a portion of content included in the content portion of the graphical user interface when there is no additional content to scroll in the direction; and outputting, for display, the graphical user interface including the updated content portion having at least the portion of the content stretched by the stretch ratio.

In another example, the disclosure is directed to a computing device. The computing device includes a display device; one or more processors; and a memory that stores instructions that, when executed by the one or more processors, cause the one or more processors to: output, for display by the display device, a graphical user interface of an application executing at a computing device, wherein the graphical user interface includes a content portion and an application interface portion different from the content portion; receive an indication of a user input to scroll, in a direction, content included in the content portion of the graphical user interface; and responsive to determining that there is no additional content to scroll in the direction: determine one or more characteristics of the user input; determine, based on at least one of the one or more characteristics of the user input, a stretch ratio; generate an updated content portion by at least applying the stretch ratio to at least a portion of content included in the content portion of the graphical user interface when there is no additional content to scroll in the direction; and output, for display by the display device, the graphical user interface including the updated content portion having at least the portion of the content stretched by the stretch ratio.

In another example, the disclosure is directed to a non-transitory computer-readable storage medium storing instructions that, when executed, cause one or more processors of a computing device to: output, for display, a graphical user interface of an application executing at a computing device, wherein the graphical user interface includes a content portion and an application interface portion different from the content portion; receive an indication of a user input to scroll, in a direction, content included in the content portion of the graphical user interface; and responsive to determining that there is no additional content to scroll in the direction: determine one or more characteristics of the user input; determine, based on at least one of the one or more characteristics of the user input, a stretch ratio; generate an updated content portion by at least applying the stretch ratio to at least a portion of content included in the content portion of the graphical user interface when there is no additional content to scroll in the direction; and output, for display, the graphical user interface including the updated content portion having at least the portion of the content stretched by the stretch ratio.

In another example, the disclosure is directed to an apparatus that includes means for outputting a graphical user interface of an application executing at a computing device, wherein the graphical user interface includes a content portion and an application interface portion different from the content portion; means for receiving an indication of a user input to scroll, in a direction, content included in the content portion of the graphical user interface; and means for, responsive to determining, by the computing device, that there is no additional content to scroll in the direction: determining, by the computing device, one or more characteristics of the user input; determining, by the computing device and based on at least one of the one or more characteristics of the user input, a stretch ratio; generating, by the computing device, an updated content portion by at least applying the stretch ratio to at least a portion of content included in the content portion of the graphical user interface when there is no additional content to scroll in the direction; and outputting, for display, the graphical user interface including the updated content portion having at least the portion of the content stretched by the stretch ratio.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
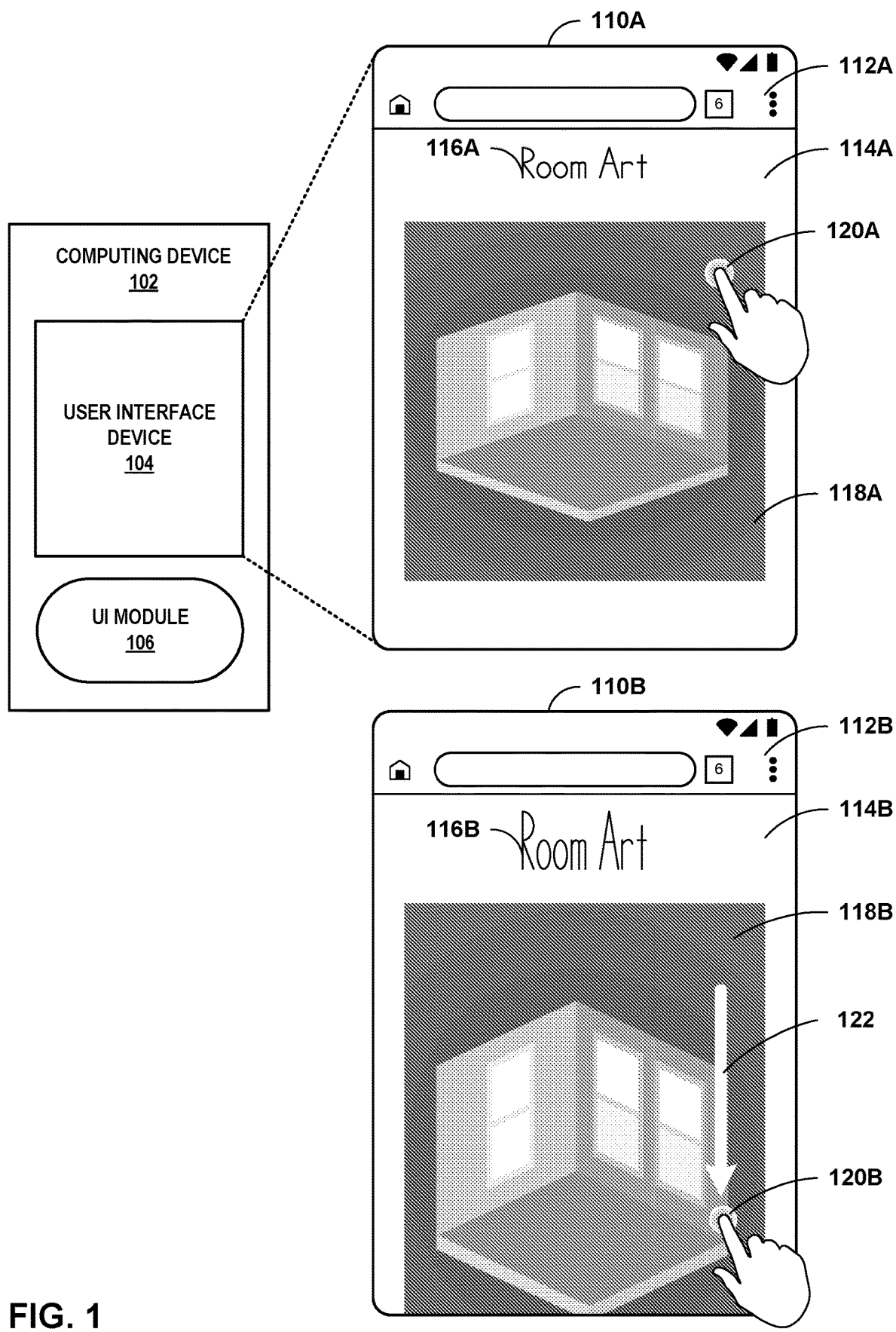
FIG. 1 is a conceptual diagram illustrating an example computing device configured to stretch content in response to an overscroll, in accordance with one or more aspects of the present disclosure.

FIG. 1 is a conceptual diagram illustrating an example computing device 102 configured to stretch content in response to an overscroll, in accordance with one or more aspects of the present disclosure. As shown in FIG. 1, computing device 102 is a mobile computing device (e.g., a mobile phone). However, in other examples, computing device 102 may be a tablet computer, a laptop computer, a desktop computer, a gaming system, a media player, an e-book reader, a television platform, an automobile navigation system, a wearable computing device (e.g., a computerized watch, computerized headset, computerized eyewear, a computerized glove), or any other type of mobile or non-mobile computing device.

Computing device 102 includes a user interface device (UID) 104. UID 104 of computing device 102 may function as an input device for computing device 102 and as an output device for computing device 102. UID 104 may be implemented using various technologies. For instance, UID 104 may function as an input device using a presence-sensitive input screen, such as a resistive touchscreen, a surface acoustic wave touchscreen, a capacitive touchscreen, a projective capacitive touchscreen, a pressure sensitive screen, an acoustic pulse recognition touchscreen, or another presence-sensitive display technology. UID 104 may function as an output (e.g., display) device using any one or more display devices, such as a liquid crystal display (LCD), dot matrix display, light emitting diode (LED) display, microLED, organic light-emitting diode (OLED) display, e-ink, or similar monochrome or color display capable of outputting visible information to a user of computing device 102.

UID 104 of computing device 102 may include a presence-sensitive display that may receive tactile input from a user of computing device 102. UID 104 may receive indications of the tactile input by detecting one or more gestures from a user of computing device 102 (e.g., the user touching or pointing to one or more locations of UID 104 with a finger or a stylus pen). UID 104 may present output to a user, for instance at a presence-sensitive display. UID 104 may present the output as a graphical user interface (e.g., graphical user interfaces 110A and 110B), which may be associated with functionality provided by computing device 102. For example, UID 104 may present various user interfaces of components of a computing platform, operating system, applications, or services executing at or accessible by computing device 102 (e.g., an electronic message application, an Internet browser application, a mobile operating system, etc.). A user may interact with a respective user interface to cause computing device 102 to perform operations relating to a function.

Computing device 102 includes UI module 106, which manages user interactions with UID 104 and other components of computing device 102. In other words, UI module 106 may act as an intermediary between various components of computing device 102 to make determinations based on user input detected by UID 104 and generate output at UID 104 in response to the user input. UI module 106 may receive instructions from an application, service, platform, or other module of computing device 102 to cause UID 104 to output a user interface (e.g., user interfaces 110). UI module 106 may manage inputs received by computing device 102 as a user views and interacts with the user interface presented at UID 104 and update the user interface in response to receiving additional instructions from the application, service, platform, or other module of computing device 102 that is processing the user input.

Graphical user interfaces (GUIs) 110A and 110B (collectively "GUIs 110") are example graphical user interfaces of a web browser application executing at computing device 102. GUI 110A includes application interface portion 112A and content portion 114A and GUI 110B includes application interface portion 112B and content portion 114B. Application interface portions 112A and 112B may collectively be referred to as "application interface portions 112" and content portions 114A and 114B may be collectively referred to as "content portions 114." As shown in FIG. 1, GUI 110A illustrates a GUI at time t1 and GUI 110B illustrates the same GUI at a later time t2, which is after the user has overscrolled the content and the content is visually stretched, in accordance with techniques of this disclosure. As shown in GUI 110B, application interface portion 112B does not include content that is visually stretched while content portion 114B does include content that is visually stretched.

Application interface portion 112A includes elements of the graphical user interface for the particular application (e.g., the web browser application). For example, application interface portion 112A may include a home button, an address bar, a browser tab switch button, and a menu button. While application interface portion 112A illustrates an example application interface for a web browser application, application interface portion 112A may include any elements of any application interface for any application including, as non-limiting examples, a mapping application, a messaging application, an email application, a game, a camera application, a photo management application, a movie application, a music application, a social media application, a shopping application, a financial application, a weather application, a fitness application, a nutrition application, a shipping application, etc.

As shown in FIG. 1, content portion 114A includes content of a web page loaded by the web browser application. The web page includes text 116A and image 118A. As illustrated in GUI 110A, application interface portion 112A and content portion 114A do not include stretched content. Instead, application interface portion 112A and content portion 114A include content rendered as originally configured by the content creator (e.g., as specified by the code for the website).

UID 104 may detect a user input (e.g., a start of a scroll gesture) at a location of UID 104 (e.g., location 120A). The user may drag their finger in a downward direction from initial location 120A to location 120B along path 122 to form the scroll gesture. As the user performs the scroll gesture, UI module 106 causes the content included within content portion 114A to scroll in a direction based on a direction of the scroll gesture. UI module 106 may be configured to scroll the content included in content portion 114A in the same direction as the scroll gesture or in an opposite direction of the scroll gesture. In the example shown in FIG. 1, the user is scrolling in a downward direction (i.e., from a location closer to the top of GUI 110A to a location closer to the bottom of GUI 110A) and, for purposes of this example, UI module 106 is configured to scroll the content included in content portion 114A in the same downward direction of the scroll gesture. As the user continues to perform the scroll gesture, additional content not currently displayed within content portion 114A may be displayed within content portion 114A. Responsive to there being no additional content to scroll, UI module 106 may determine that the user is overscrolling the content and may initiate a visual indication of the overscroll.

UI module 106 determines how to visually indicate the overscroll based at least in part on one or more characteristics of the scroll gesture. For example, UI module 106 may determine a velocity, distance, acceleration, location, etc. of the scroll gesture at any point during the scroll gesture and may continually determine one of more of these characteristics during the duration of the scroll gesture. That is, UI module 106 may determine a respective numerical or other type of value associated with each scroll gesture characteristic.

Using one or more values of these scroll gesture characteristics, UI module 106 may determine an intensity of the scroll gesture. Based on the intensity and/or on one or more values of one or more of the scroll gesture characteristics without calculating the intensity, UI module 106 determines a stretch ratio. The stretch ratio is an amount by which UI module 106 stretches content included in content portion 114A. The stretch ratio may increase as the intensity, the velocity, or the acceleration of the scroll gesture increase.

UI module 106 may continually update the stretch ratio as UID 104 continues to detect the scroll gesture. For example, if the user stops moving their finger at location 120B, UI module 106 may continue to determine that the stretch ratio is the same stretch ratio as the stretch ratio right before the user ceased moving their finger such that the content continues to appear to be visually stretched the same amount even though the user is no longer moving their finger. That is, UI module 106 may continually or periodically calculate a stretch ratio to add to the previously calculated stretch ratio. For example, if UI module 106 determines, based on the intensity of the scroll gesture, an initial stretch ratio of 1.2:1 and the user continues to move their finger (e.g., along path 122), UI module 106 may determine a new stretch ratio of 1.2:1, which is the same as the previous stretch ratio. However, as the user is continuing to move their finger, UI module 106 may combine the initial 1.2:1 stretch ratio with the new 1.2:1 stretch ratio. The resulting stretch ratio may be 1.4:1, 1.3:1, or another ratio that is greater than or equal to 1.2:1 as UI module 106 may combine the stretch ratios in any manner. By continuing to increase the stretch ratio as the user continues to scroll, the indication to the user that extent of scrolling has been reached may become increasingly pronounced, thereby improving the noticeability of the indication and increasing the likelihood that the user will discontinue the scrolling input.

In some instances, if the current location of the scroll gesture is proximate to an edge of GUI 110A, UI module 106 may apply a proportionality inverse function to determine the stretch ratio. That is, as the scroll gesture moves closer to the edge of GUI 110A, UI module 106 may stretch content included in content portion 114A by a smaller stretch ratio. In other words, the additional amount that UI module 106 increases the stretch as the user continues to perform the scroll gesture and the scroll gestures approaches the edge of UID 104 may be less than if the current location of the scroll gesture was farther away from the edge of UID 104. For example, if the location of the scroll gestures is proximate to an edge of UID 104, UI module 106 may determine that the new stretch ratio is only 1.05:1 whereas if the location of the scroll gestures with the same characteristics were farther away from the edge of UID 104, UI module 106 may determine that the new stretch ratio is 1.5:1. By utilizing a higher stretch ratio when the input is further from the edge (and so the scroll gesture could potentially continue for longer), the indication of overscrolling may be more pronounced. This may increase the noticeability of the indication and so reduce the likelihood of the user continuing the scroll gesture for the full extent possible, thereby saving on computational resources associated with processing such a gesture.

UI module 106 may also adjust the stretch ratio based on the length of the scroll gesture. For example, UI module 106 may determine a length of the user input (e.g., an amount of distance the detected user input traveled while the user is performing the scroll gesture) and may increase or decrease the stretch ratio based on the length of the user input. In some instances, UI module 106 adjusts the stretch ratio inversely proportional to the length of the user input.

As the particular values for one or more of the scroll gestures characteristics change while the user continues to perform the scroll gesture even after the visual indication of overscrolling is output by UID 104, UI module 106 may continually update the values of the scroll gesture characteristics and may update the visual indication of the overscroll based on the updated values of one or more of the scroll gesture characteristics.

In some examples, even though the user may no longer be performing the scroll gesture (i.e., UID 104 is no longer detecting a user input), UI module 106 may still determine that that user overscrolled the content included in content portion 114A and may still cause UID 104 to output a visual indication of the overscroll. For example, a user may "throw" the content using the scroll gesture. That is, the user may terminate the scroll gesture while continuing to positively accelerate their finger at UID 104. Responsive to determining that the scroll gesture was positively accelerating (i.e., increasing in velocity) at the time of termination, UI module 106 may determine that the content should continue to scroll even though the user is no longer performing the scroll gesture. In such examples, in response to determining that there is no additional content to scroll, UI module 106 may determine the stretch ratio based on the speed at which the content is scrolling when reaching the end of the content to scroll. This may provide a clear indication that the scrolling of the content has stopped because the extent of the scrolling has been reached, and not for some other reason, and so may prevent the user from providing a subsequent scrolling input.

UI module 106 may apply the stretch ratio by taking a bitmap of the content included within content portion 114A and increasing the amount of space each pixel in the bitmap occupies. For example, if the stretch ratio is 1.5:1, UI module 106 will cause each pixel from the original, unstretched, content to occupy 1.5 pixels in the direction of the scroll gesture. That is, if the scroll gesture is in a downward direction, UI module 106 will increase the length of each pixel to be 1.5 pixels while maintaining the same width (i.e., 1 pixel). In some examples, UI module 106 will cause the pixels to be displayed prior to applying the stretch ratio to the bitmap of the content included within content portion 114A. UI module 106 may then generate a bitmap of the content as displayed and apply the stretch ratio to the generated bitmap as described above.

In some instances, UI module 106 may apply the stretch ratio prior to the content be displayed by UID 104. Rather than generating a bitmap of the content already displayed, UI module 106 may apply the stretch ratio to the low-level surface that holds and controls what the end pixels will look like on the display prior to the pixels being displayed. That is, prior to UID 104 displaying content, the graphics pipeline, which may include UI module 106, applies the stretch ratio to the content that will be included within content portion 114A such that the content appears stretched when displayed by UID 104.

In the example shown in FIG. 1, UI module 106 has stretched text 116B and image 118B to indicate the overscroll. While illustrated as text 116B and image 118B being uniformly stretched, in other examples, text 116B may not be stretched while image 118B is stretched. That is, UI module 106 may selectively stretch elements included in the content based on a type of each element or may apply different stretch ratios to different types of elements included with the content. As another example, UI module 106 may only apply the stretch ratio to pixels located between the current location of the scroll gesture (e.g., location 120B) and the side of UID 104 away from which the scroll gesture is moving. In such an example, UI module 106 may stretch text 116B and the portion of image 118B located between location 120B and the top of UID 104. Such examples may minimize the amount of stretching performed while enabling the user to detect the overscrolling promptly by providing the stretching at a location of the display at which the user is most likely to be looking. In various instances, rather than stretching text 116B and image 118B, UI module 106 may, instead, stretch the whitespace between text 116B and image 118B while maintaining the same 1:1 pixel ratio for text 116B and image 118B. This may ensure that the indication of overscrolling is provided to the user without reducing the "readability" of the text and image. In this way, the user may be able to finish consuming the displayed content, even if they have started overscrolling.

In some examples, rather than uniformly stretching the content included in content portions 114, UI module 106 may apply different stretch ratios to different portions of content included in content portions 114 based on a distance from an edge of UID 104. For example, UI module 106 may apply a larger stretch ratio to content located away from the current location of the scroll gesture (e.g., top of UID 104 away from location 120B) while applying a smaller stretch ratio to content closer to the current location of the scroll gesture (e.g., closer to location 120B). UI module 106 may generate a stretch ratio gradient to apply to the content or may generate a stepped stretch ratio change for each unit of distance away from the edge of UID 104, as non-limiting examples. Such a gradient or stepped changes may not be uniform or consistent for each unit of distance. Instead, the size of changes in the stretch ratio may also change based on the distance of the particular pixels of content from the edge of UID 104 away from which the scroll gesture is moving.

Further, UI module 106 may cause the content to visually bounce back to the original, unstretched, size. That is, UI module 106 may gradually reduce the additional amount the content is visually stretched and then cause the content to visually return to the original size as if the content has weight and elasticity. For example, while the content is being stretched out, UI module 106 may determine that the stretch ratio is initially 1.1:1, then 1.2:1, then 1.25:1, then 1.28:1, then 1.3:1, and finally 1.31:1. The percentages are mere examples and indicate an additional amount of space each pixel may occupy when stretched. The stretch ratios may be significantly larger, such as 2:1, 3:1, or more. After reaching the maximum stretch ratio, UI module 106 reduces the stretch ratio until the stretch ratio is back to 1:1. In some examples, UI module 106 may reduce the stretch ratio to less than 1:1 (e.g., 0.9:1, 0.8:1, etc.) and then increase the stretch ratio again until it is 1:1, thereby causing the content portion to visually bounce. Once UID 104 has ceased displaying the visual indication of the overscroll, the content is displayed at a 1:1 ratio, which is the original, unstretched, size of the content.

While described in the context of overscrolling, the visual stretching techniques described herein may also be used to visually indicate other actions. For example, when a user pulls down to refresh content (e.g., to reload a web page, update sensor data, update current weather information, etc.), UI module 106 may determine a stretch ratio as described above and may visually stretch content displayed by UID 104.

Techniques of this disclosure may provide one or more technical benefits. For example, by visually stretching content in accordance with the techniques of this disclosure, a user may more quickly realize that the end of the content has been reached and may cease performing the scroll gesture sooner than if there is no or a different visual indication of overscrolling the content, thereby saving processor cycles and power. Further, for other actions, visually stretching the content may provide the user a visual confirmation that the computing device has received the user's input and is initiating the requested action, which may also prevent the user from repeatedly performing the same input due to uncertainty if the computing device receives the input and initiates the requested action.

Figure 2:
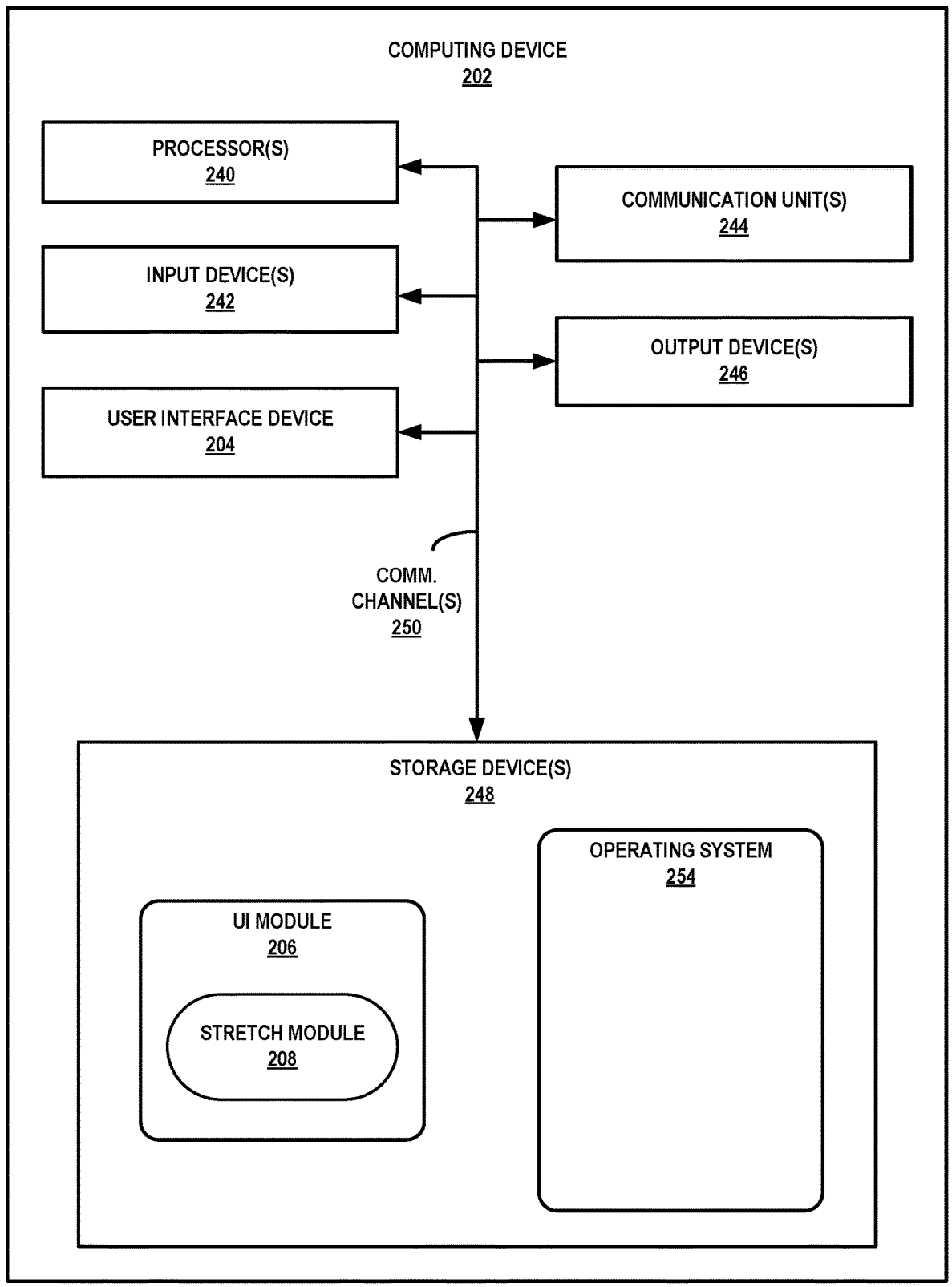
FIG. 2 is a block diagram illustrating an example computing device configured to stretch content in response to an overscroll, in accordance with one or more aspects of the present disclosure.

FIG. 2 is a block diagram illustrating an example computing device 202, in accordance with one or more aspects of the present disclosure. Computing device 202 of FIG. 2 is an example of computing device 102 of FIG. 1. Computing device 202 is only one particular example of computing device 102 of FIG. 1, and many other examples of computing device 102 may be used in other instances. In the example of FIG. 2, computing device 202 may be a wearable computing device, a mobile computing device (e.g., a smartphone), or any other computing device. Computing device 202 of FIG. 2 may include a subset of the components included in example computing device 202 or may include additional components not shown in FIG. 2.

As shown in the example of FIG. 2, computing device 202 includes user interface device 204 ("UID 204"), one or more processors 240, one or more input devices 242, one or more communication units 244, one or more output devices 246, and one or more storage devices 248. Storage devices 248 of computing device 202 also include operating system 254 and UI module 206.

Communication channels 250 may interconnect each of the components 240, 242, 244, 246, 248, 204, and 214 for inter-component communications (physically, communicatively, and/or operatively). In some examples, communication channels 250 may include a system bus, a network connection, an inter-process communication data structure, or any other method for communicating data.

One or more input devices 242 of computing device 202 may be configured to receive input. Examples of input are tactile, audio, and video input. Input devices 242 of computing device 202, in one example, includes a presence-sensitive display, touch-sensitive screen, mouse, keyboard, voice responsive system, video camera, microphone or any other type of device for detecting input from a human or machine.

One or more output devices 246 of computing device 202 may be configured to generate output. Examples of output are tactile, audio, and video output. Output devices 246 of computing device 202, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 202 may be configured to communicate with external devices via one or more wired and/or wireless networks by transmitting and/or receiving network signals on the one or more networks. Examples of communication unit 244 include a network interface card (e.g., such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more storage devices 248 within computing device 202 may store information for processing during operation of computing device 202. In some examples, storage device 248 is a temporary memory, meaning that a primary purpose of storage device 248 is not long-term storage. Storage devices 248 on computing device 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with UI module 206, stretch module 208, and operating system 254.

One or more processors 240 may implement functionality and/or execute instructions within computing device 202. For example, processors 240 on computing device 202 may receive and execute instructions stored by storage devices 248 that execute the functionality of UI module 206 and stretch module 208. These instructions executed by processors 240 may cause UI module 206 of computing device 202 to visually stretch content in response to an overscroll as described herein.

In some examples, UID 204 of computing device 202 may include functionality of input devices 242 and/or output devices 246. In the example of FIG. 2, UID 204 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to output device 246, e.g., at a display. In the example of FIG. 2, UID 204 may present a user interface.

While illustrated as an internal component of computing device 202, UID 204 also represents an external component that shares a data path with computing device 202 for transmitting and/or receiving input and output. For instance, in one example, UID 204 represents a built-in component of computing device 202 located within and physically connected to the external packaging of computing device 202 (e.g., a screen on a mobile phone). In another example, UID 204 represents an external component of computing device 202 located outside and physically separated from the packaging of computing device 202 (e.g., a monitor, a projector, etc. that shares a wired and/or wireless data path with a tablet computer).

UI module 206 may include all functionality of UI module 106 of computing device 102 of FIG. 1 and may perform similar operations as UI module 106 for managing a user interface (e.g., user interfaces 110A and 110B) that computing device 202 provides at UID 204. For example, UI module 206 of computing device 202*h* may include stretch module 208 that determines the stretch ratio and applies the stretch ratio to the content included in content portion 114A to generate the updated content portion 114B, as discussed above with respect to FIG. 1. That is, stretch module 208 may apply the stretch ratio to the bitmap representation of the content included in content portion 114A or to the low-level surface that holds and controls what the end pixels will look like on UID 204 prior to the pixels being displayed by UID 204 (i.e., within the graphics pipeline prior to the pixels being displayed by UID 204). UI module 206 may cause UID 204 to display the updated content portion within GUI 110B.

Figure 3:
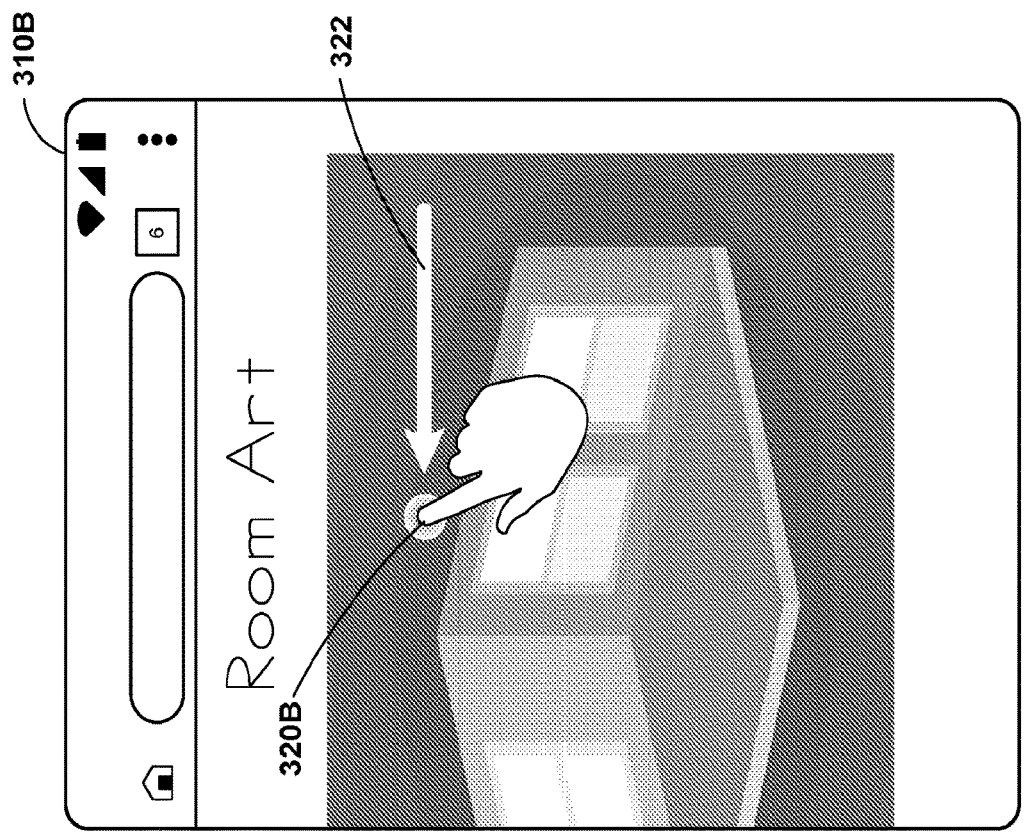
FIG. 3 is a conceptual diagram illustrating an example of stretching content during a horizontal axis overscroll event, in accordance with aspects of this disclosure.
Figure 3:
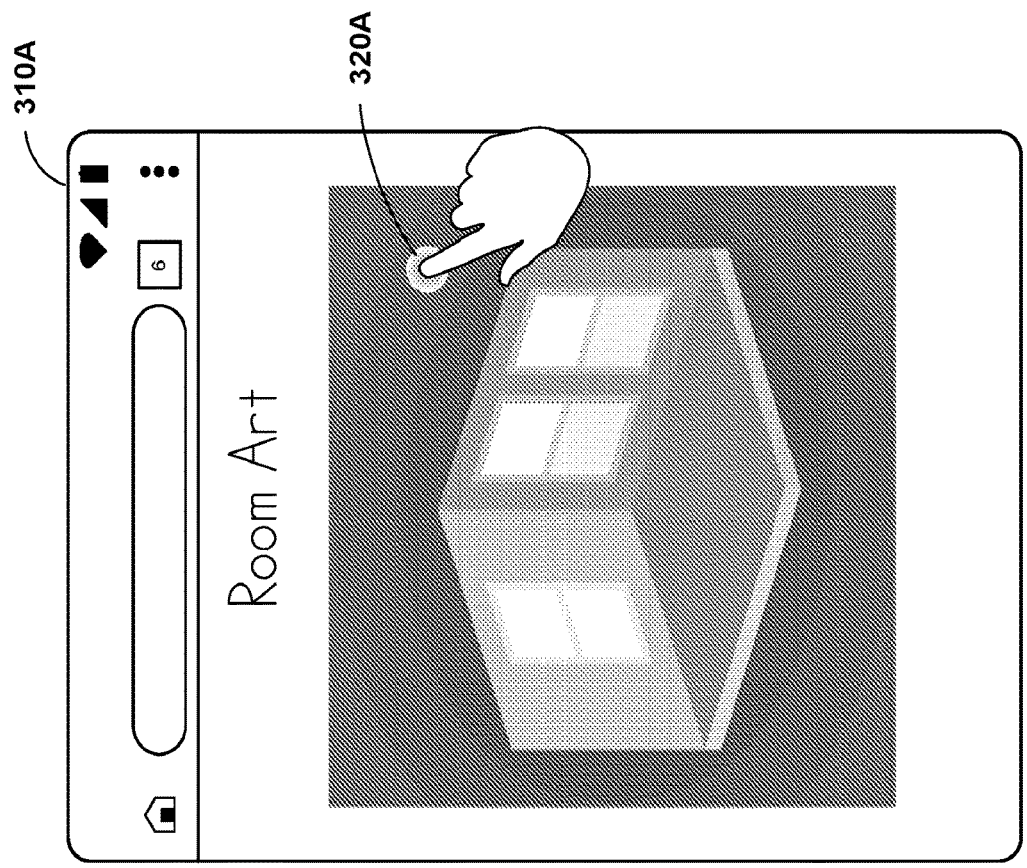

FIG. 3 is a conceptual diagram illustrating an example of stretching content during a horizontal axis overscroll event, in accordance with aspects of this disclosure. For purposes of illustration only, this horizontal axis overscroll content stretching is described within the context of computing device 202 of FIG. 2.

FIG. 3 includes GUI 310A and GUI 310B. GUI 310A is an example GUI that includes unstretched content displayed by UID 204. GUI 310B is an example GUI that includes content stretched along a horizontal axis displayed by UID 204 at a second, later time, after a horizontal overscroll.

UID 204 may detect a user input at location 320A (e.g., a user may place their finger on or near UID 204 and a presence-sensing element of UID 204 may detect an object proximate to a surface of UID 204 at location 320A). The user may move their finger horizontally (e.g., from right to left as shown in FIG. 3) along path 322 to scroll the content horizontally. UI module 206 may determine that there is no additional content to scroll and stretch module 208 may determine a stretch ratio based on one or more characteristics of the scroll gesture detected by UID 204 and being performed by the user. Based on the determined stretch ratio, UI module 206 may generate an updated content portion that is stretched in the horizontal direction and cause UID 104 to display the updated content portion (e.g., as shown in GUI 310B).

UI module 206 may stretch content horizontally in the same manner as described with respect to the vertical stretching in FIG. 1. That is, UI module 206 may change the stretch ratio based on the distance of the scroll gesture, the distance of each pixel from the edge of UID 204 away from the which scroll gesture is moving, etc. Further, as described with respect to UI module 106 and vertical scroll gestures in FIG. 1, UI module 206 may also only stretch content located between a current location of the scroll gesture (e.g., location 320B) and the edge of UID 204 away from the which scroll gesture is moving.

Figure 4:
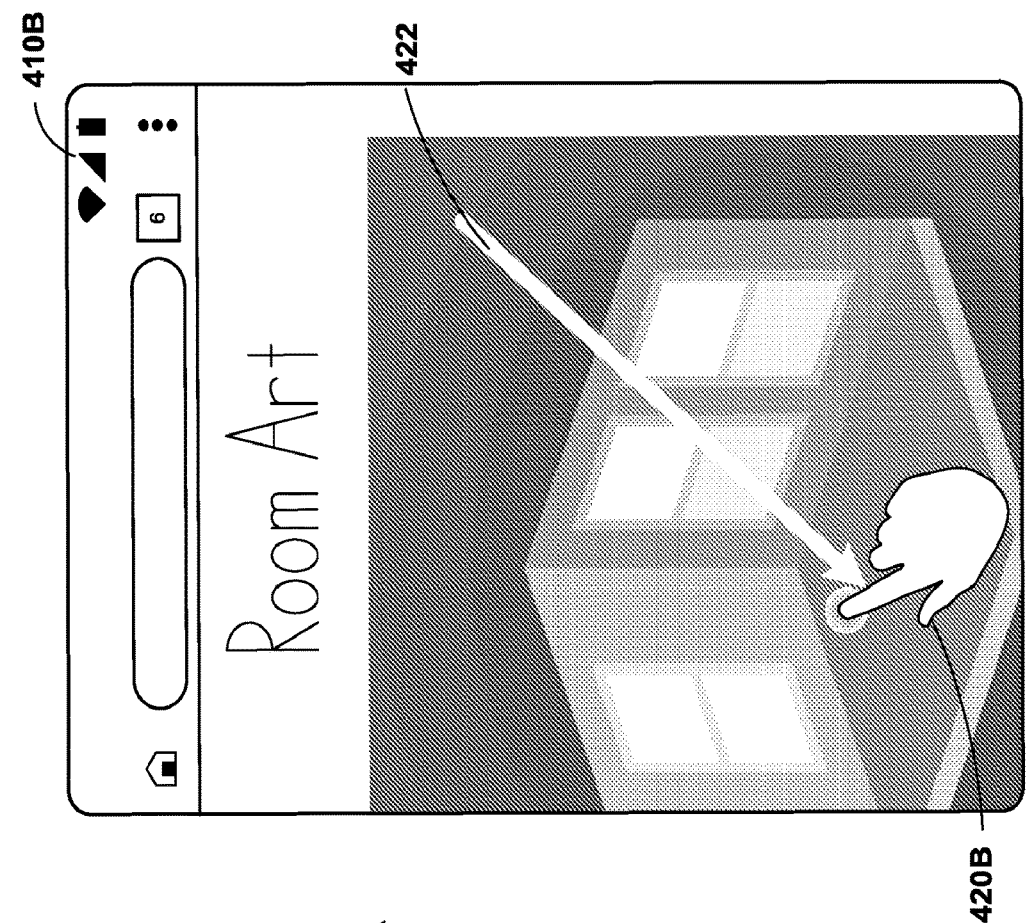
FIG. 4 is a conceptual diagram illustrating an example of stretching content during a two axes overscroll event, in accordance with aspects of this disclosure.
Figure 4:
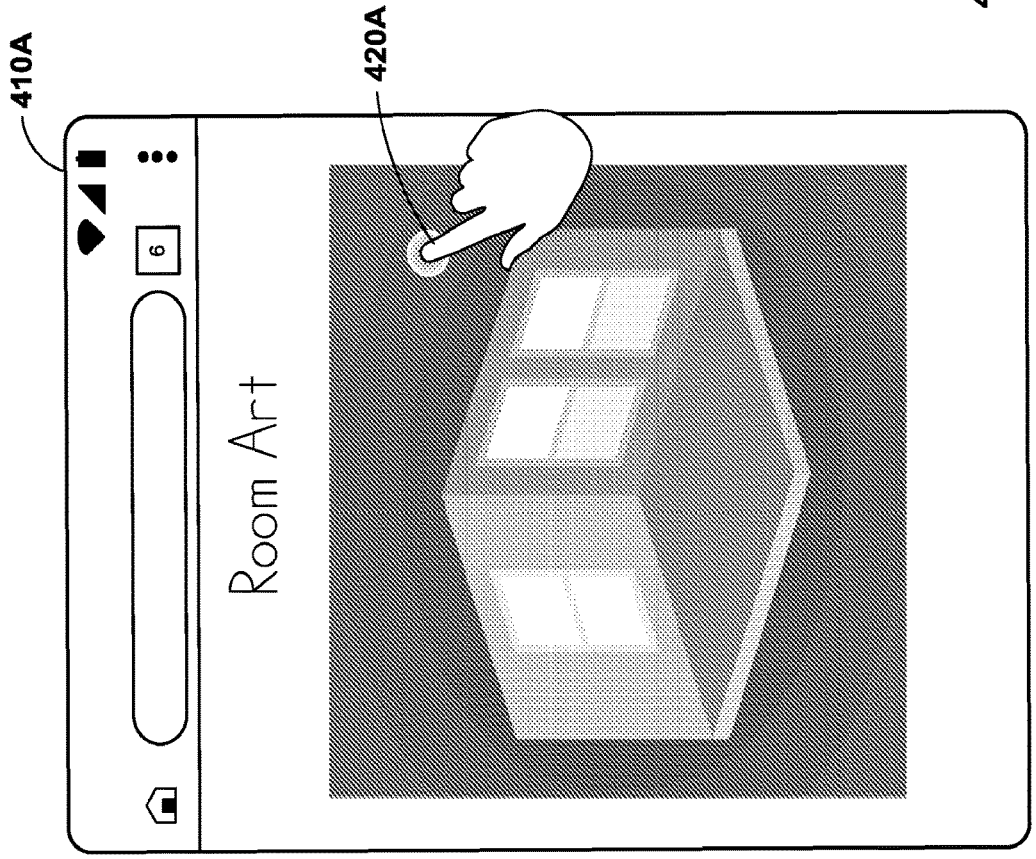

FIG. 4 is a conceptual diagram illustrating example of stretching content during a two axes overscroll event, in accordance with aspects of this disclosure. For purposes of illustration only, this horizontal axis overscroll content stretching is described within the context of computing device 202 of FIG. 2.

UI module 206 and stretch module 208 may also simultaneously stretch content along two axes, as shown in FIG. 4. GUI 410A is an example GUI that includes unstretched content displayed by UID 204. GUI 410B is an example GUI that includes content stretched along both a horizontal axis and a vertical axis, which is displayed by UID 204 at a second, later time, after a two-axis overscroll.

During two axis scrolling gesture user inputs that result in a two axis overscroll, stretch module 208 may determine the stretch ratio based on the direction of the scroll gesture user input. One example two axis scrolling gesture is shown in FIG. 4. UID 204 detects the initial location of the scroll gesture user input at location 420A and then the user moves their finger along path 422 to location 420B. Path 422 is not only horizontal or only vertical in direction or nearly only horizontal or vertical. Instead, path 422 is in a direction that is substantially along a combination of horizontal and vertical axis.

When UID 204 detects such a two axis scroll gesture user input, stretch module 208 may determine the stretch ratio based on the vertical and horizontal components of the scroll gesture. For example, stretch module 208 may determine a first stretch ratio in a direction away from the first edge of UID 204 based on component of the user input moving away from the first edge, a first stretch ratio in a direction away from the first edge. Stretch module 208 may determine a second stretch ratio in a direction away from a second edge of UID 204 based on a component of the user input moving away from the second edge. UI module 206 may generated an updated content portion of the GUI (e.g., as shown in GUI 410B) by applying the first stretch ratio and the second stretch ratio to the content included in the content portion of the GUI when there is no additional content to scroll in the direction such that the portion of the content is visually stretched relative to the first edge and the second edge.

As one example, the two axis scroll gesture user input may have a vertical component that is two times the horizontal component. That is, for each unit of vertical movement of the scroll gesture, there is one-half of a unit of horizontal movement of the scroll gesture. In such an example, stretch module 208 may determine that the first stretch ratio is 1.5:1 in the vertical direction and the second stretch ratio is 1.25:1 in the horizontal direction. While these example stretch ratios are linearly related to the relative size of the vertical and horizontal components of the two axis scroll gesture user input, such a relationship is not required. Instead, in some examples, the horizontal and vertical stretch ratios may be logarithmically related, exponentially related, fractionally related, or may not have any direct correspondence.

UI module 206 applies the first and second stretch ratios to at least a portion of the content included in the content portion of the GUI. For example, in applying the 1.5:1 vertical and the 1.25:1 horizontal stretch ratios, UI module 206 may cause each pixel of the portion of the content to be 1.5 pixels tall and 1.25 pixels wide. UI module 206 may apply these stretch ratios to textual content, graphical content, whitespace, or any other type of content included within the GUI, collectively or independently.

Figure 5:
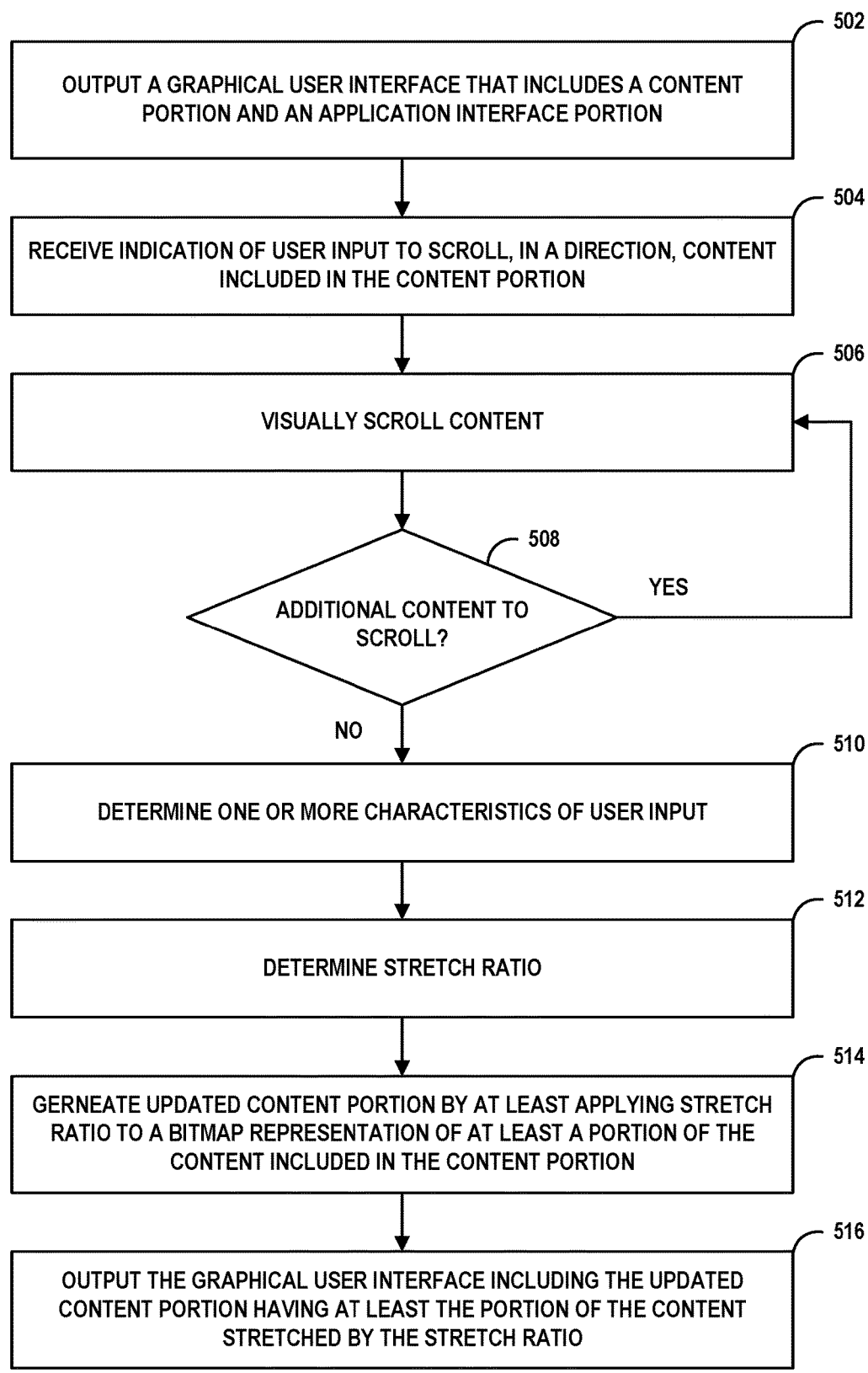
FIG. 5 is a flowchart illustrating example operations for stretching content, in accordance with one or more aspects of the present disclosure.

FIG. 5 is a flowchart illustrating example operations for stretching content, in accordance with one or more aspects of the present disclosure. For purposes of illustration only, the example operations are described below within the context of GUIs 110 of FIG. 1 and computing device 202 of FIG. 2.

UID 204 outputs a graphical user interface that includes a content portion and an application interface portion (502). The application interface portion (e.g., application interface portion 112A) may include various UI elements for controlling an application currently executing at computing device 202. The content portion (e.g., content portion 114A) may include content loaded from a remote server, entered by a user, dynamically generated by the application, etc. that is distinct from the application interface elements.

Computing device 202 may receive an indication of user input to scroll, in a direction, content included in the content portion (504). For example, UID 204 may detect the start of a scroll gesture user input (e.g., at location 120A) to scroll content included in content portion 114A in a direction. UI module 206 may visually scroll the content in the direction (506). The direction of the scroll gesture may specify the direction in which to scroll the content. For example, if the scroll gesture user input moved from the top of the content portion towards the bottom of the content portion (e.g., from location 120A to location 120B along path 122), UI module 106 may cause the content to visually scroll in a downward direction. As one example, the content may scroll as if the scroll gesture stuck to the content at the initial location and dragged the content such that the portion of content at the initial location moves such that the portion of content is still located at the current location of the scroll gesture.

UI module 106 may continue to scroll the content so long as there is additional content to scroll ("YES" branch of 508). That is, UI module 106 continues to scroll the content included within content portion 114A until there is no additional content not currently displayed within content portion 114A and that may be displayed within content portion 114A. As shown in content portion 114A, text 116A is the top of the web page. As such, there is no additional content above text 116A for the user to scroll.

Responsive to determining that there is no additional content to scroll ("NO" branch of 508), UI module 206 may determine one or more characteristics of the scroll gesture user input (510). For example, UI module 206 may determine a velocity, distance, acceleration, location, etc. of the scroll gesture user input. While initially described as occurring in response to there being no additional content to scroll, UI module 206 determine one or more characteristics of the scroll gesture user input at any point during the scroll gesture and may continually determine one of more of these characteristics during the duration of the scroll gesture. In some examples, UI module 206 may determine an intensity of the scroll gesture based on at least one of the one or more characteristics of the scroll gesture. The intensity of the scroll gesture indicates the magnitude of the scroll gesture.

Stretch module 208 may determine a stretch ratio based on the intensity of the scroll gesture user input and/or at least one of the one or more characteristics of the scroll gesture (512). The stretch ratio may be a single stretch ratio that may be applied to a portion of all of the content included in content portion 114B or two or more different stretch ratios applied to different portions of the content included in content portion 114B. For example, stretch module 208 may determine a larger stretch ratio to be applied to content located along the edge away from which the scroll gesture user input is moving than a stretch ratio applied to content located closer to the current location of the scroll gesture user input.

UI module 206 may generate an updated content portion of the GUI (e.g., GUI 110B) by at least applying the stretch ratio(s) to at least a portion of the content included in the content portion of the GUI (514). UI module 206 may apply the stretch ratio(s) to a bitmap representation of at least the portion of the content or during the rendering process in the graphics pipeline prior to the content being displayed by UID 204. When UI module 206 applies the stretch ratio(s), UI module 206 may apply one or more stretch ratios to white space between graphical and/or textual content elements, may apply different stretch ratios to different types of elements included with in the content portion, and may apply different stretch ratios based on the location of pixels included in the bitmap relative to the location of an edge of the content portion, an edge of UID 204, and/or a current location of the scroll gesture user input.

After UI module 206 generates the updated content portion, UID 204 outputs the graphical user interface including the updated content portion having at least the portion of content stretched by the stretch ratio (516). Examples of a GUI having content stretch in response to a vertical overscroll, horizontal overscroll, and two axis overscroll are show in GUI 110B of FIG. 1, GUI 310B of FIG. 3, and GUI 410B of FIG. 4, respectively.

This disclosure includes the following examples:

Example 1: A method includes outputting, for display by a display device, a graphical user interface of an application executing at a computing device, wherein the graphical user interface includes a content portion and an application interface portion different from the content portion; receiving, by the computing device, an indication of a user input to scroll, in a direction, content included in the content portion of the graphical user interface; and responsive to determining, by the computing device, that there is no additional content to scroll in the direction: determining, by the computing device, one or more characteristics of the user input; determining, by the computing device and based on at least one of the one or more characteristics of the user input, a stretch ratio; generating, by the computing device, an updated content portion by at least applying the stretch ratio to at least a portion of content included in the content portion of the graphical user interface when there is no additional content to scroll in the direction; and outputting, for display, the graphical user interface including the updated content portion having at least the portion of the content stretched by the stretch ratio.

Example 2: The method of example 1, wherein the stretch ratio changes based on a respective distance of each pixel included in the portion of content included in the content portion of the graphical user interface from at least one edge of the display device away from which the user input moves.

Example 3: The method of example 1 or 2, wherein applying the stretch ratio includes applying the stretch ratio to one or more of a bitmap representation of at least the portion of the content included in the content portion of the graphical user interface or to a low-level surface prior to the pixels being displayed.

Example 4: The method of any of examples 1 through 3, wherein the application interface portion of the graphical user interface is not stretched by the stretch ratio.

Example 5: The method of any of examples 1 through 4, wherein the portion of the content stretched by the stretch ratio is a portion of the content displayed between an edge of the application interface portion of the graphical user interface and a location at which the user input is detected.

Example 6: The method of any of examples 1 through 5, wherein the direction of the scroll is away from a first edge and a second edge of the graphical user interface, wherein determining the stretch ratio comprises: determining, based on a component of the user input moving away from the first edge, a first stretch ratio in a direction away from the first edge; and determining, based on a component of the user input moving away from the second edge, a second stretch ratio in a direction away from the second edge, wherein generating the updated content portion comprises applying, by the computing device, the first stretch ratio and the second stretch ratio to at least the portion of the content included in the content portion of the graphical user interface when there is no additional content to scroll in the direction such that the portion of the content is visually stretched relative to both the first edge and the second edge.

Example 7: The method of any of examples 1 through 6, wherein generating the updated content portion comprises: identifying one or more textual elements included in the portion of the content; and stretching space between the one or more textual elements by the stretch ratio without stretching the one or more textual elements.

Example 8: The method of any of examples 1 through 7, further includes determining, by the computing device, a length of the user input; and adjusting, by the computing device, the stretch ratio based on the length of the user input.

Example 9: The method of example 8, wherein adjusting the stretch ratio comprises adjusting the stretch ratio inversely proportional to the length of the user input.

Example 10: The method of any of examples 1 through 9, wherein the updated content portion is a first updated content portion, the method further includes responsive to a cessation of the user input to scroll the content, generating a second updated content portion by at least ceasing to apply the stretch ratio to the content.

Example 11: The method of any of examples 1 through 10, wherein the direction of the scroll is one of vertical, horizontal, or a combination of vertical and horizontal.

Example 12: A computing device includes a display device; one or more processors; and a memory that stores instructions that, when executed by the one or more processors, cause the one or more processors to: output, for display by the display device, a graphical user interface of an application executing at a computing device, wherein the graphical user interface includes a content portion and an application interface portion different from the content portion; receive an indication of a user input to scroll, in a direction, content included in the content portion of the graphical user interface; and responsive to determining that there is no additional content to scroll in the direction: determine one or more characteristics of the user input; determine, based on at least one of the one or more characteristics of the user input, a stretch ratio; generate an updated content portion by at least applying the stretch ratio to at least a portion of content included in the content portion of the graphical user interface when there is no additional content to scroll in the direction; and output, for display by the display device, the graphical user interface including the updated content portion having at least the portion of the content stretched by the stretch ratio.

Example 13: The computing device of example 12, wherein the stretch ratio changes based on a respective distance of each pixel included in the portion of content included in the content portion of the graphical user interface from at least one edge of the display device away from which the user input moves.

Example 14: The computing device of any of examples 12 through 13, wherein the portion of the content stretched by the stretch ratio is a portion of the content displayed between an edge of the application interface portion of the graphical user interface and a location at which the user input is detected.

Example 15: The computing device of any of examples 12 through 14, wherein the direction of the scroll is away from a first edge and a second edge of the graphical user interface, wherein the instructions cause the one or more processors to determine the stretch ratio by at least causing the one or more processors to: determine, based on a component of the user input moving away from the first edge, a first stretch ratio in a direction away from the first edge; and determine, based on a component of the user input moving away from the second edge, a second stretch ratio in a direction away from the second edge, and wherein the instructions cause the one or more processors to generate the updated content portion by at least causing the one or more processors to apply the first stretch ratio and the second stretch ratio to at least the portion of the content included in the content portion of the graphical user interface when there is no additional content to scroll in the direction such that the portion of the content is visually stretched relative to both the first edge and the second edge.

Example 16: The computing device of any of examples 12 through 15, wherein the instructions further cause the one or more processors to: determine a length of the user input; and adjust the stretch ratio inversely proportional to the length of the user input.

Example 17: The computing device of any of examples 12 through 16, wherein the direction of the scroll is one of vertical, horizontal, or a combination of vertical and horizontal.

Example 18: A non-transitory computer-readable storage medium storing instructions that, when executed by one or more processors of a computing device, cause the one or more processors to: output, for display, a graphical user interface of an application executing at a computing device, wherein the graphical user interface includes a content portion and an application interface portion different from the content portion; receive an indication of a user input to scroll, in a direction, content included in the content portion of the graphical user interface; and responsive to determining that there is no additional content to scroll in the direction: determine one or more characteristics of the user input; determine, based on at least one of the one or more characteristics of the user input, a stretch ratio; generate an updated content portion by at least applying the stretch ratio to at least a portion of content included in the content portion of the graphical user interface when there is no additional content to scroll in the direction; and output, for display, the graphical user interface including the updated content portion having at least the portion of the content stretched by the stretch ratio.

Example 19: The non-transitory computer-readable storage medium of example 18, wherein the direction of the scroll is away from a first edge and a second edge of the graphical user interface, wherein the instructions cause the one or more processors to determine the stretch ratio by at least causing the one or more processors to: determine, based on a component of the user input moving away from the first edge, a first stretch ratio in a direction away from the first edge; and determine, based on a component of the user input moving away from the second edge, a second stretch ratio in a direction away from the second edge, and wherein the instructions cause the one or more processors to generate the updated content portion by at least causing the one or more processors to apply the first stretch ratio and the second stretch ratio to at least the portion of the content included in the content portion of the graphical user interface when there is no additional content to scroll in the direction such that the portion of the content is visually stretched relative to both the first edge and the second edge.

Example 20: The non-transitory computer-readable storage medium of any of examples 18 through 19, wherein the stretch ratio changes based on a respective distance of each pixel included in the portion of content included in the content portion of the graphical user interface from at least one edge of a display device of the computing device away from which the user input moves.

Example 21: The non-transitory computer-readable storage medium of any of examples 18 through 20, wherein the portion of the content stretched by the stretch ratio is a portion of the content displayed between an edge of the application interface portion of the graphical user interface and a location at which the user input is detected.

Example 22: A computing device comprising means for performing any combination of the methods of examples 1-11.

Example 23: A computing system comprising means for performing any combination of the methods of examples 1-11.

Example 24: A non-transitory computer-readable storage medium encoded with instructions that, when executed by one or more processors, cause the one or more processors to perform any combination of the methods of examples 1-11.

Example 25: Any combination of examples 1-24.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   outputting, for display by a display device, a graphical user interface of an application executing at a computing device, wherein the graphical user interface includes a content portion and an application interface portion different from the content portion;
   receiving, by the computing device, an indication of a user input to scroll, in a direction away from a first edge of the graphical user interface along a vertical axis and away from a second edge of the graphical user interface along a horizontal axis, content included in the content portion of the graphical user interface; and
   responsive to determining, by the computing device, that there is no additional content to scroll in the direction:
      determining, by the computing device, one or more characteristics of the user input;
      determining, by the computing device and based on at least one of the one or more characteristics of the user input and the direction of the user input away from the first edge of the graphical user interface along the vertical axis and away from the second edge of the graphical user interface along the horizontal axis, a stretch ratio;
      generating, by the computing device, an updated content portion by at least applying the stretch ratio to at least a portion of content included in the content portion of the graphical user interface when there is no additional content to scroll in the direction; and
      outputting, for display, the graphical user interface including the updated content portion having at least the portion of the content stretched by the stretch ratio such that the content is visually stretched relative to the first edge and the second edge.

2. The method of claim 1, wherein the stretch ratio changes based on a respective distance of each pixel included in the portion of content included in the content portion of the graphical user interface from at least one edge of the display device away from which the user input moves.

3. The method of claim 1, wherein applying the stretch ratio includes applying the stretch ratio to one or more of a bitmap representation of at least the portion of the content included in the content portion of the graphical user interface or to a low-level surface prior to the content being displayed.

4. The method of claim 1, wherein the application interface portion of the graphical user interface is not stretched by the stretch ratio.

5. The method of claim 1, wherein the portion of the content stretched by the stretch ratio is a portion of the content displayed between an edge of the application interface portion of the graphical user interface and a location at which the user input is detected.

6. The method of claim 1,
   wherein determining the stretch ratio based on the at least one of the one or more characteristics of the user input and the direction of the user input away from the first edge of the graphical user interface along the vertical axis and away from the second edge of the graphical user interface along the horizontal axis further comprises:
      determining, based on a component of the user input moving away from the first edge, a first stretch ratio in a direction away from the first edge; and determining, based on a component of the user input moving away from the second edge, a second stretch ratio in a direction away from the second edge, and wherein generating the updated content portion comprises applying, by the computing device, the first stretch ratio and the second stretch ratio to at least the portion of the content included in the content portion of the graphical user interface when there is no additional content to scroll in the direction such that the portion of the content is visually stretched relative to both the first edge and the second edge.

7. The method of claim 1, wherein generating the updated content portion comprises:
identifying one or more textual elements included in the portion of the content; and
stretching space between the one or more textual elements by the stretch ratio without stretching the one or more textual elements.

8. The method of claim 1, further comprising:
determining, by the computing device, a length of the user input; and
adjusting, by the computing device, the stretch ratio based on the length of the user input.

9. The method of claim 8, wherein adjusting the stretch ratio comprises adjusting the stretch ratio inversely proportional to the length of the user input.

10. The method of claim 1, wherein the updated content portion is a first updated content portion, the method further comprising:
responsive to a cessation of the user input to scroll the content, generating a second updated content portion by at least ceasing to apply the stretch ratio to the content.

11. A computing device comprising:
a display device;
one or more processors; and
a memory that stores instructions that, when executed by the one or more processors, cause the one or more processors to:
output, for display by the display device, a graphical user interface of an application executing at a computing device, wherein the graphical user interface includes a content portion and an application interface portion different from the content portion;
receive an indication of a user input to scroll, in a direction away from a first edge of the graphical user interface along a vertical axis and away from a second edge of the graphical user interface along a horizontal axis, content included in the content portion of the graphical user interface; and
responsive to determining that there is no additional content to scroll in the direction:
determine one or more characteristics of the user input;
determine, based on at least one of the one or more characteristics of the user input and the direction of the user input away from the first edge of the graphical user interface along the vertical axis and away from the second edge of the graphical user interface along the horizontal axis, a stretch ratio;
generate an updated content portion by at least applying the stretch ratio to at least a portion of content included in the content portion of the graphical user interface when there is no additional content to scroll in the direction; and output, for display by the display device, the graphical user interface including the updated content portion having at least the portion of the content stretched by the stretch ratio such that the content is visually stretched relative to the first edge and the second edge.

12. The computing device of claim 11,
wherein the instructions cause the one or more processors to determine the stretch ratio based on the at least one of the one or more characteristics of the user input and the direction of the user input away from the first edge of the graphical user interface along the vertical axis and away from the second edge of the graphical user interface along the horizontal axis by at least causing the one or more processors to:
determine, based on a component of the user input moving away from the first edge, a first stretch ratio in a direction away from the first edge; and
determine, based on a component of the user input moving away from the second edge, a second stretch ratio in a direction away from the second edge, and
wherein the instructions cause the one or more processors to generate the updated content portion by at least causing the one or more processors to apply the first stretch ratio and the second stretch ratio to at least the portion of the content included in the content portion of the graphical user interface when there is no additional content to scroll in the direction such that the portion of the content is visually stretched relative to both the first edge and the second edge.

13. The computing device of claim 11, wherein the portion of the content stretched by the stretch ratio is a portion of the content displayed between an edge of the application interface portion of the graphical user interface and a location at which the user input is detected.

14. The computing device of claim 11, wherein the instructions further cause the one or more processors to: determine a length of the user input; and adjust the stretch ratio inversely proportional to the length of the user input.

15. A non-transitory computer-readable storage medium storing instructions that, when executed by one or more processors of a computing device, cause the one or more processors to:
output, for display, a graphical user interface of an application executing at a computing device, wherein the graphical user interface includes a content portion and an application interface portion different from the content portion;
receive an indication of a user input to scroll, in a direction away from a first edge of the graphical user interface along a vertical axis and away from a second edge of the graphical user interface along a horizontal axis, content included in the content portion of the graphical user interface; and
responsive to determining that there is no additional content to scroll in the direction:
determine one or more characteristics of the user input;
determine, based on at least one of the one or more characteristics of the user input and the direction of the user input away from the first edge of the graphical user interface along the vertical axis and away from the second edge of the graphical user interface along the horizontal axis, a stretch ratio;
generate an updated content portion by at least applying the stretch ratio to at least a portion of content included in the content portion of the graphical user interface when there is no additional content to scroll in the direction; and output, for display, the graphical user interface including the updated content portion having at least the portion of the content stretched by the stretch ratio such that the content is visually stretched relative to the first edge and the second edge.

16. The non-transitory computer-readable storage medium of claim 15, wherein the instructions cause the one or more processors to determine the stretch ratio based on the at least one of the one or more characteristics of the user input and the direction of the user input away from the first edge of the graphical user interface along the vertical axis and away from the second edge of the graphical user interface along the horizontal axis by at least causing the one or more processors to:

determine, based on a component of the user input moving away from the first edge, a first stretch ratio in a direction away from the first edge; and determine, based on a component of the user input moving away from the second edge, a second stretch ratio in a direction away from the second edge, and wherein the instructions cause the one or more processors to generate the updated content portion by at least causing the one or more processors to apply the first stretch ratio and the second stretch ratio to at least the portion of the content included in the content portion of the graphical user interface when there is no additional content to scroll in the direction such that the portion of the content is visually stretched relative to both the first edge and the second edge.

17. The non-transitory computer-readable storage medium of claim 15, wherein the stretch ratio changes based on a respective distance of each pixel included in the portion of content included in the content portion of the graphical user interface from at least one edge of a display device of the computing device away from which the user input moves.

18. The non-transitory computer-readable storage medium of claim 15, wherein the portion of the content stretched by the stretch ratio is a portion of the content displayed between an edge of the application interface portion of the graphical user interface and a location at which the user input is detected.

* * * * *